United States Patent Office 3,534,609
Patented Oct. 20, 1970

3,534,609
TEMPERATURE MEASURING DEVICES
Hugh Willmott Grenfell and Brian William Meek, Port Talbot, Glamorgan, Wales, assignors to The Steel Company of Wales Limited, Port Talbot, Glamorgan, Wales
Filed Mar. 28, 1968, Ser. No. 716,830
Claims priority, application Great Britain, Mar. 21, 1968, 54,131/66
Int. Cl. G01k 11/24
U.S. Cl. 73—339                    12 Claims

ABSTRACT OF THE DISCLOSURE

Apparatus and method for measuring the temperature of a medium by transmitting an ultrasonic sound wave therethrough and by measuring the time required for the wave to pass through the medium in which changes in the velocity of the ultrasonic wave enable the temperature of the medium to be determined. A transmitter probe and a receiver probe are disposed on opposite sides of the medium to transmit the wave therethrough and are connected to the medium by water cooled extension bars. A timing mechanism is connected between the probes to measure the time delay between the transmitted pulse and the received pulse.

---

This invention relates to a method and means for the measurement of temperatures of a solid or fluid medium. The invention is particularly, but not exclusively, concerned with the measurement of temperature in the manufacture of steel. In a particular application, which is exemplary of the many applications of the present invention, the method and apparatus of the invention may be used to measure the temperature of steel slabs in the reheat furnaces, and of bars which are stationary on rolling tables.

It is generally known that a medium, such as a metal, suffers a change in its modulus of elasticity with a change in temperature and this property is utilised in the present invention to measure the temperature of the metal by utilising the velocity of the sound wave as it passes through the metal as the corresponding change occurs in the velocity of the sound wave in accordance with the change in the modulus of elasticity.

According to the present invention, therefore, there is provided a method of measuring the temperature of a medium which comprises transmitting an ultrasonic sound wave therethrough and measuring the time required for the wave to pass through the medium whereby changes in the velocity of the ultrasonic wave enable the temperature of the medium to be determined. The present invention also includes apparatus for measuring the temperature of the medium which apparatus comprises a transmitter probe for the emission of ultrasonic energy, a receiver probe for the reception of ultrasonic energy and timing means connected with each of said probes and adapted to measure the time delay between them.

In one embodiment of the present invention the transmitter probe and the receiver probe are disposed about the medium under test so that an ultrasonic sound wave emitted from the transmitter probe passes through the medium and is received by said receiver probe. The medium may typically be a mass of metal at a temperature greater than 800° C. in which case it is desirable that the probes be watercooled. This may be effected by providing extension bars between the medium and the probes and water-cooling the extension bars so that the probes operate at a temperature below their maximum operating temperature. The water-cooling of the extension bars may be effected by means of a copper jacket provided about the bars, the jacket being protected by means of a disc of refractory material from the heat of the medium.

The water-cooled extension bars provide direct contact. Alternatively a material which softens but does not melt at the operating temperature may be employed. A typical coupling medium between the probe and the extension bars is grease. In operation it is appreciated that the ends of the bars remote from the probe are placed in contact with the test medium.

The ultrasonic waves are produced and received after transmission through the medium by a commercially available instrument which incorporates a timing mechanism which enables the time delay between the transmitted and received pulses to be measured. The frequency of the ultrasonic waves may be of any desired value but in the present experiments it is thought that frequencies of the order of 150 kilocycles per second may be satisfactory. The timing mechanism provides a time measurement which in conjunction with the length of the path through the test medium would enable the velocity of sound to be determined for that medium at the particular temperature. The path length is, of course, the distance between the probes which in the apparatus described above will be the length of the test medium plus the length of the extension bars.

Following is a description by way of example and with reference to the accompanying drawings of a particular experiment in accordance with the present invention.

Figure 1:
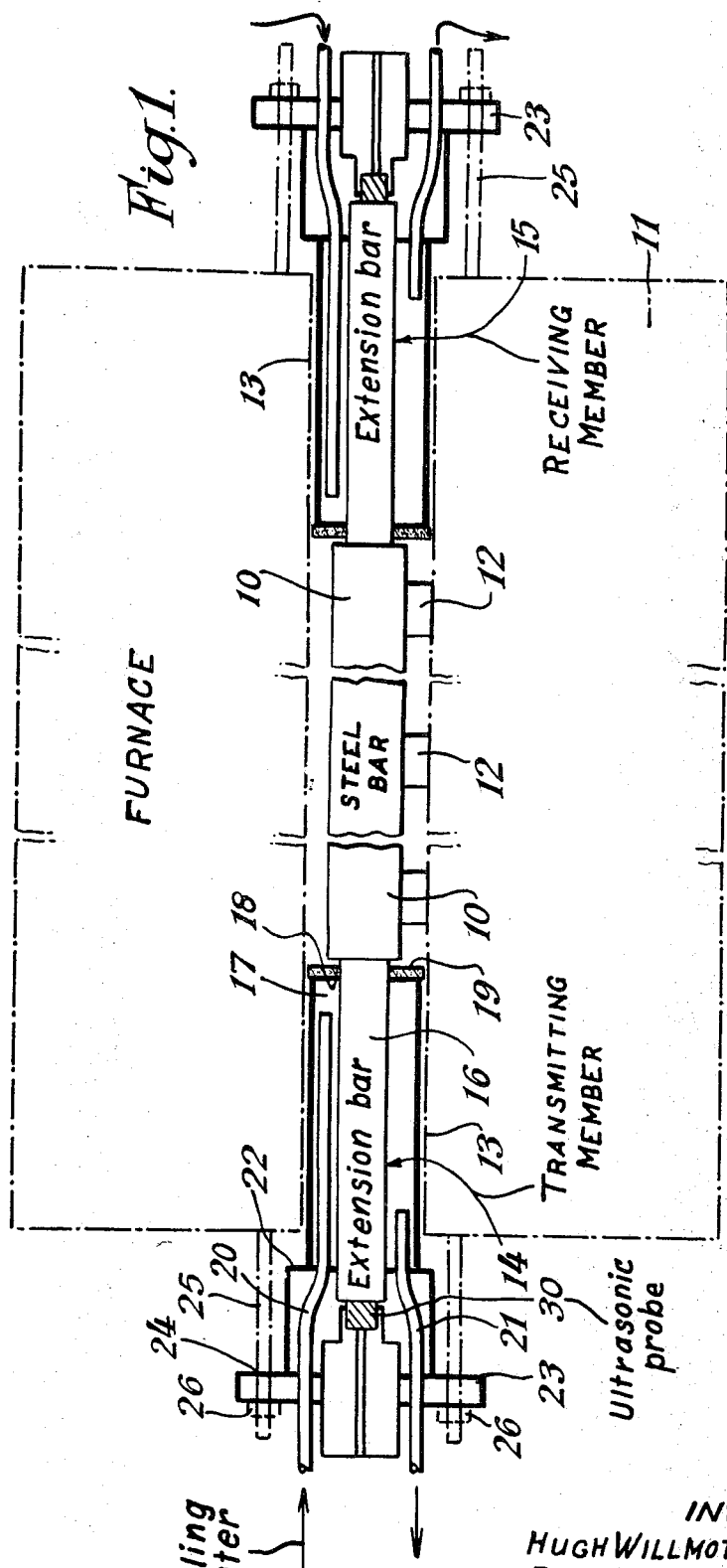
FIG. 1 is a diagram of the test apparatus.

The test specimen 10 was a mild steel bar substantially 2″ in diameter and approximately 15″ long. The test specimen was mounted in a furnace 11 on spaced support blocks 12. The furnace 11 was a 3″ diameter molybdenum wound tube furnace some 30″ long.

Thermocouples were inserted in the test specimen at spaced intervals along its length in order to check the temperature gradient along the specimen.

The specimen 10 was located towards the centre of the cylindrical opening 13 in furnace 12 and a transmitting member 14 was inserted into the furnace at one end and a receiving member 15 was inserted into the furnace at the other end. Each of the transmitting and receiving members 14 and 15 respectively comprises a metal extension bar 16 extending axially of the cylindrical opening 13 in furnace 11, an inner end of the extension bar 16 abutting the adjacent end of the test specimen 10 the outer end of the extension bar 16 being disposed outwardly of the body of the furnace 11. Each extension bar 16 is provided with a cylindrical water jacket 17 extending about the cylindrical surface of the annular inner end 18 of which is provided with an annular refractory shield 19. The water jacket 17 extends substantially along the length of the extension bar 16 and terminates outwardly of the body of the furnace 11. The outer end of the water jacket 17 is provided with a water inlet conduit 20 which extends within jacket 17 towards the inner end 18 of the jacket. A water outlet conduit 21 is provided so that water circulating within jacket 17 leaves via outlet 21 from a point towards the outer end of the jacket.

The outer end of the water jacket 17 is provided with an expanded casing or flange portion 22 which extends outwardly or rearwardly of the extension bar 16 to terminate in a transverse mounting flange 23. The mounting flange 23 is provided with a pair of diammetrically disposed drillings 24 adapted to receive mounting studs 25 carried by the outer surface of tube furnace 11. The studs 25 are threaded towards their outer end and are adapted to receive a securing nut 26 which on tightening, serves to urge the extension bar 16 into abutting contact with the adjacent end of test specimen 10. The expanded flange portion 22 accommodates an ultrasonic probe 30 of well known construction. The body of the probe 30 is carried by mounting flange 23 and is biased into abutting contact with the outer end of extension bar 16. The coupling between the probe 30 and said outer end of extension bar 16 is effected with grease.

A similar assembly is inserted into the furnace 11 at the other end. The transmitter probe 30 is coupled to a pulse transmitter and trigger unit 32 which is also connected to an oscilloscope 33 the arrangement being such that the pulse transmitter and trigger unit can activate the transmitter probe 30 to transmit a pulse of ultrasonic energy through extension bar 16 and through test specimen 10 to the extension bar of the receiving member 15 and to the receiving probe itself. The signal from the receiving probe is amplified by an amplifier 34 and is also fed to the oscilloscope. Timing apparatus 35 is included and is coupled between the two probes and is capable of measuring the time taken for the ultrasonic pulse to traverse the distance from the transmitter probe 30 to the receiving probe.

Figure 2:
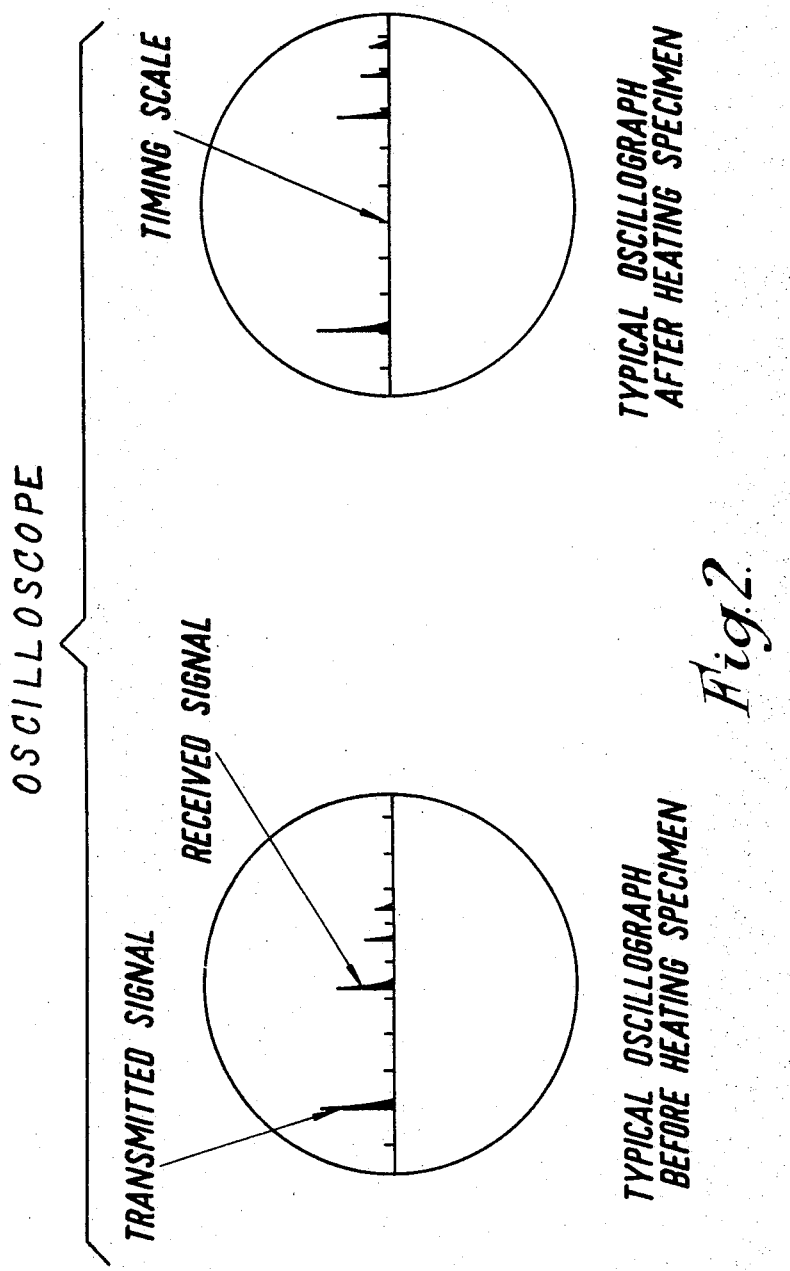
FIG. 2 is a sketch of oscillograph readings before and after heating the specimen.
Figure 3:
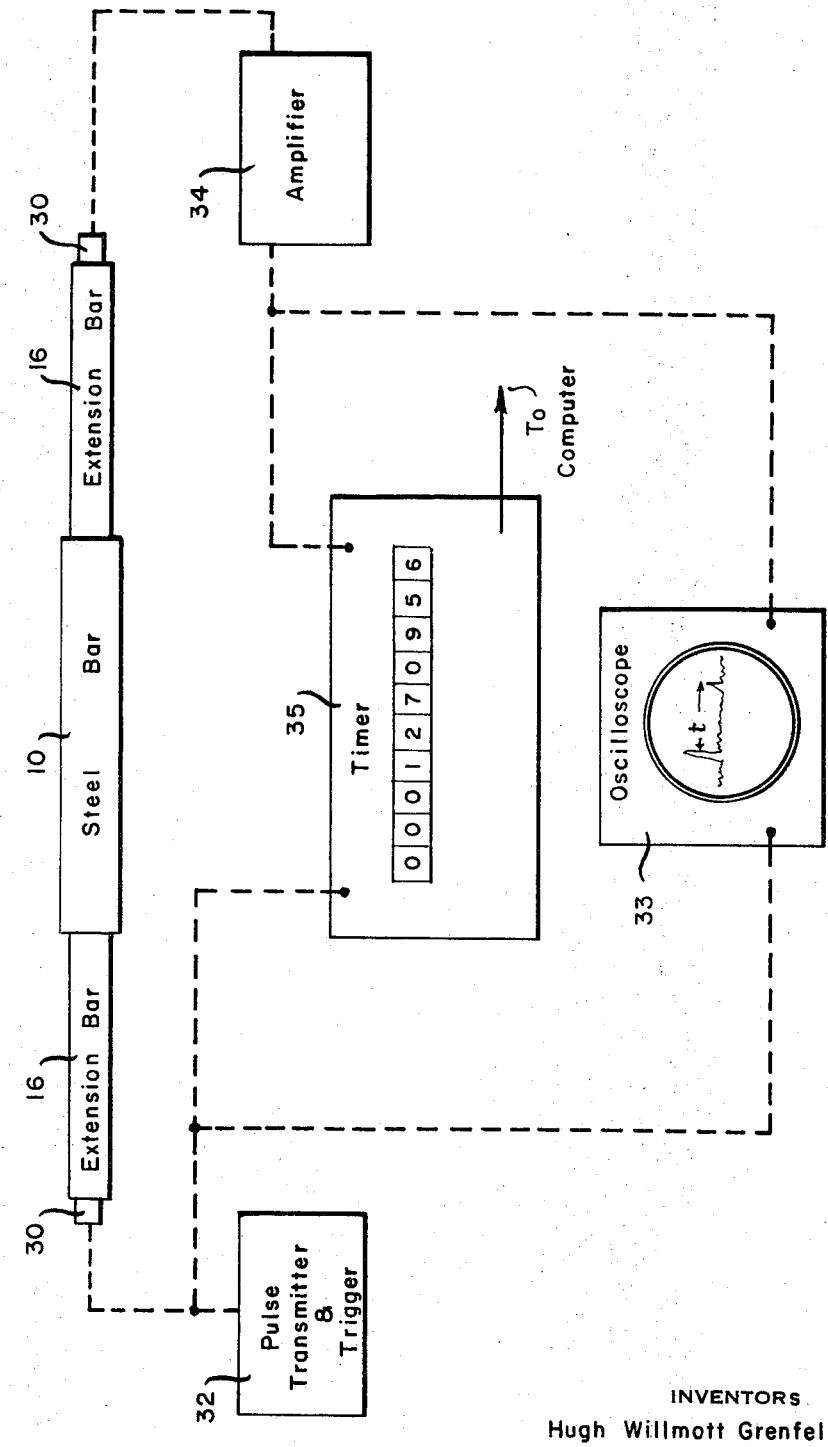
FIG. 3 is a diagram of the test apparatus and associated electrical equipment with the electrical connections shown schematically by dotted lines.

FIG. 2 of the accompanying drawings illustrates the typical oscillograph readings obtained before and after heating the specimen in the furnace.

The distance traversed by the ultrasonic pulse from one probe to the other includes the distances travelled along the extension bars. To eliminate the effect of the time taken in traversing the extension bars, a pulse echo technique is used in respect of one of the extension bars to overcome this. In this case the probe in the receiving member 15 is disconnected and the transmitting probe 30 is used both for transmitting and receiving. A pulse is transmitted from transmitting probe 30 and an echo is obtained from the end of the extension bar 16 and a signal is also shown on the oscilloscope. The time interval between the transmitted and the received signals in this case is the time that the pulse has taken to traverse twice the length of the extension bar. By subtracting this time by that obtained in the direct transmission technique, the time taken for the pulse to traverse the length of the specimen may be obtained. Considering this time together with the known length of the specimen, the velocity of sound through the specimen can be determined. This velocity is dependent upon the temperature of the metal and hence the temperature can be calculated.

We claim:
1. A method for measuring the temperature of a mass of metal at a temperature greater than 800° C. comprising transmitting an ultrasonic wave therethrough by means of a transmitter probe and a receiver probe disposed about said metal whereby an ultrasonic sound wave emitted from said transmitter probe passes through said metal and is received by said receiver probe water cooling said probles and measuring the time required to pass through said metal whereby changes in the velocity of said ultrasonic wave enable the temperature of said metal to be determined.

2. A method of measuring the temperature of a mass of metal at a temperature greater than 800° C. comprising transmitting an ultrasonic sound wave therethrough by means of a water-cooled transmitter probe and water-cooled receiver probe disposed about said metal whereby an ultrasonic wave emitted from said transmitter probe passes through said metal and is received by said receiver probe and having water cooled extension bars coupled between said metal and said probes, and measuring the time required for said wave to pass through said metal by means of a timing mechanism operably connected to said probes whereby changes in the velocity of said wave enable the temperature of the metal to be measured.

3. Apparatus for measuring the temperature of a metal comprising a transmitter probe for the emission of ultrasonic energy, a receiver probe for the reception of ultrasonic energy, and timing means operably connected with said probes and adapted to measure the time delay between the transmitted and received pulses, each of said probes being provided with extension bars disposed between said metal and probes, and cooling means on said extension bars for maintaining the temperature of said probes below their maximum operating temperature.

4. A method as claimed in claim 1 wherein the frequencies of the ultrasonic waves are of the order of 150 kilocycles per second.

5. A method as claimed in claim 2 wherein the coupling between the test medium and the extension bar is dry.

6. A method as claimed in claim 2 wherein the coupling between the test medium and the extension bar is a material which softens but does not melt at the operating temperature.

7. A method as claimed in claim 2 wherein the coupling between the probe and the extension bar is grease.

8. Apparatus as claimed in claim 3 wherein the cooling means comprises water jackets in which the extension bars are accommodated.

9. Apparatus as claimed in claim 3 wherein the probes are coupled to the extension bars by means of grease and are located with respect to the probe by means of a retaining bar threaded through a mounting flange on the probe.

10. Apparatus as claimed in claim 3 wherein an annular disc of refractory material is disposed about the extension bar adjacent said medium to protect the end of the water jacket from the heat of the medium.

11. Apparatus as claimed in claim 3 wherein the transmitter probe is connected to a transmitter and trigger unit for transmission of the pulse of ultrasonic energy through the test medium.

12. Apparatus as claimed in claim 3 wherein the timing means comprises an oscilloscope connected to the transmitter probe and receiver probe and a timing device the arrangement being such that the magnitude of the time delay between transmission and reception of the pulse is shown on the oscilloscope.

References Cited

UNITED STATES PATENTS

| 2,667,063 | 1/1954 | Cunningham | 73—67.6 |
| 3,137,169 | 6/1964 | Clement et al. | |
| 3,250,120 | 5/1966 | Dickinson | 73—67.6 |
| 3,350,942 | 11/1967 | Peltola. | |

OTHER REFERENCES

NASA Tech Brief No. 68-10319, Ultrasonic Temperature Measuring Device, August 1968.

Johnson, V.A. Measurement of Wire Temperature. In Western Electric Technical Digest No. 10, April 1968, pp. 25-26.

LOUIS R. PRINCE, Primary Examiner

F. SHOON, Assistant Examiner

U.S. Cl. X.R.

73—67.6